United States Patent
Blanke

(10) Patent No.: US 9,341,711 B2
(45) Date of Patent: May 17, 2016

(54) METHOD FOR DETECTING TRAFFIC INFRACTIONS IN A TRAFFIC LIGHT ZONE THROUGH REAR END MEASUREMENT BY A RADAR DEVICE

(71) Applicant: JENOPTIK Robot GmbH, Monheim (DE)

(72) Inventor: Oliver Blanke, Duesseldorf (DE)

(73) Assignee: JENOPTIK Robot GmbH, Monheim (DE)

( * ) Notice: Subject to any disclaimer, the term of this patent is extended or adjusted under 35 U.S.C. 154(b) by 314 days.

(21) Appl. No.: 14/211,071

(22) Filed: Mar. 14, 2014

(65) Prior Publication Data

US 2014/0266858 A1   Sep. 18, 2014

(30) Foreign Application Priority Data

Mar. 15, 2013   (DE) .......................... 10 2013 102 683

(51) Int. Cl.

| | |
|---|---|
| *G01S 13/86* | (2006.01) |
| *G01S 13/06* | (2006.01) |
| *G01S 13/32* | (2006.01) |
| *G01S 13/42* | (2006.01) |
| *G01S 13/91* | (2006.01) |
| *G08G 1/017* | (2006.01) |

(Continued)

(52) U.S. Cl.
CPC ................ *G01S 13/867* (2013.01); *G01S 13/91* (2013.01); *G08G 1/0175* (2013.01)

(58) Field of Classification Search
CPC ......... G01S 13/06; G01S 13/32; G01S 13/42; G01S 13/867; G01S 13/91; G01S 13/93; G01S 13/931; G01S 2013/91; G08G 1/01; G08G 1/0116; G08G 1/0137; G08G 1/0175; G08G 1/04; G08G 1/052; G08G 1/054
USPC ................... 342/52, 55, 66, 70–72, 109, 175; 340/907, 917, 936, 937; 701/117–119

See application file for complete search history.

(56) References Cited

U.S. PATENT DOCUMENTS

| | | | | |
|---|---|---|---|---|
| 3,243,806 A | * | 3/1966 | Handschin | ............. G01S 13/92 340/937 |
| 5,041,828 A | * | 8/1991 | Loeven | ................ G08G 1/0175 340/936 |

(Continued)

FOREIGN PATENT DOCUMENTS

| | | |
|---|---|---|
| EP | 2 048 515 A1 | 4/2009 |
| EP | 2 341 367 A2 | 7/2011 |

*Primary Examiner* — Peter Bythrow
(74) *Attorney, Agent, or Firm* — Duane Morris LLP

(57) ABSTRACT

A method for detecting a traffic violation in a traffic light zone through rear end measurement by a FMCW radar device (1). A specific position ($sP_1$) assigned to the front of a vehicle (3) and the radial velocity are derived from the measurement signal obtained at a first measurement time ($t_1$), and a first anticipated position ($eP_1$) for the front of the vehicle is calculated by the distance-time rule at the second measurement time ($t_2$) by means of the time period between the first measurement time ($t_1$) and the second measurement time ($t_2$). Through repeated calculation of an anticipated position for the front of the vehicle at further measurement times, an anticipated time when the front of the vehicle crosses a stop line (5) defining the traffic light zone is predicted iteratively with the determined vehicle velocity.

4 Claims, 1 Drawing Sheet

(51) Int. Cl.
*G08G 1/01* (2006.01)
*G08G 1/052* (2006.01)
*G08G 1/054* (2006.01)

(56) References Cited

U.S. PATENT DOCUMENTS

| | | | | |
|---|---|---|---|---|
| 6,111,523 | A * | 8/2000 | Mee | G08G 1/054 340/936 |
| 6,573,929 | B1 * | 6/2003 | Glier | G07B 15/06 340/933 |
| 6,970,102 | B2 * | 11/2005 | Ciolli | G08G 1/052 340/425.5 |
| 7,433,764 | B2 * | 10/2008 | Janssen | G08G 1/0175 382/105 |
| 7,633,433 | B2 * | 12/2009 | Behrens | G01S 13/42 340/936 |
| 7,647,180 | B2 * | 1/2010 | Breed | G08G 1/161 340/436 |
| 7,821,422 | B2 * | 10/2010 | Hutchison | G01S 13/92 340/907 |
| 8,035,546 | B2 * | 10/2011 | Nalezinski | G01S 7/021 342/104 |
| 8,115,670 | B2 * | 2/2012 | Klein | G01S 13/584 340/936 |
| 8,531,520 | B2 * | 9/2013 | Stricklin | G08G 1/0175 348/143 |
| 8,593,336 | B2 * | 11/2013 | Kajiki | G01S 7/4017 342/165 |
| 2004/0252193 | A1 * | 12/2004 | Higgins | G08G 1/0175 348/149 |
| 2005/0156757 | A1 * | 7/2005 | Garner | G08G 1/097 340/907 |
| 2006/0047371 | A1 * | 3/2006 | Janssen | G08G 1/0175 701/1 |
| 2006/0055560 | A1 * | 3/2006 | Janssen | G08G 1/01 340/933 |
| 2006/0066472 | A1 * | 3/2006 | Janssen | G08G 1/01 342/104 |
| 2008/0278365 | A1 * | 11/2008 | Klein | G01S 13/584 342/104 |
| 2008/0278366 | A1 * | 11/2008 | Behrens | G01S 7/41 342/109 |
| 2009/0102699 | A1 * | 4/2009 | Behrens | G01S 13/42 342/109 |
| 2013/0099943 | A1 * | 4/2013 | Subramanya | G01S 7/2926 340/933 |
| 2014/0210646 | A1 * | 7/2014 | Subramanya | B61L 29/28 340/928 |

* cited by examiner

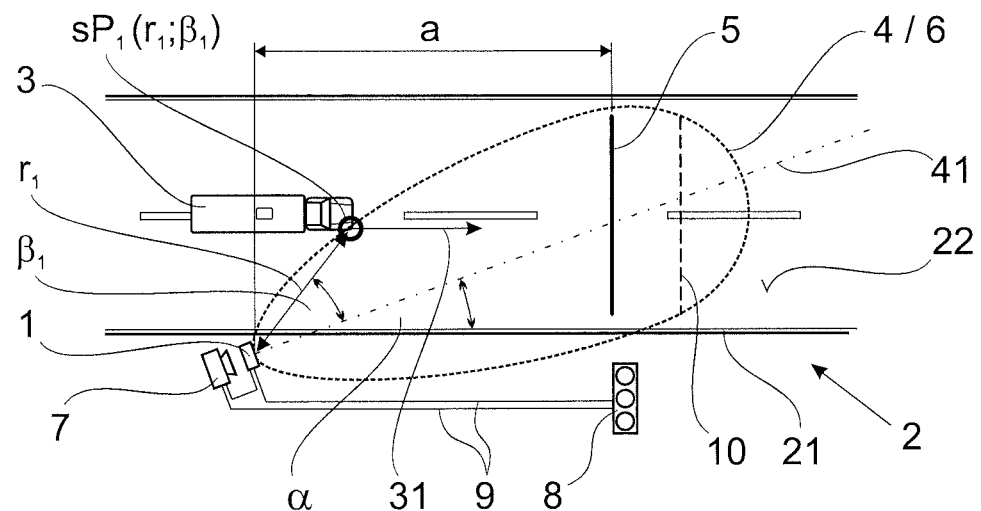
Fig. 1a ($t_1$)
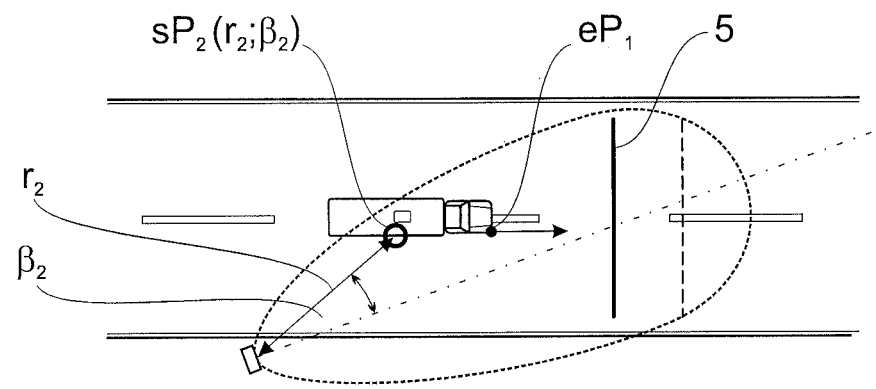
Fig. 1b ($t_2$)
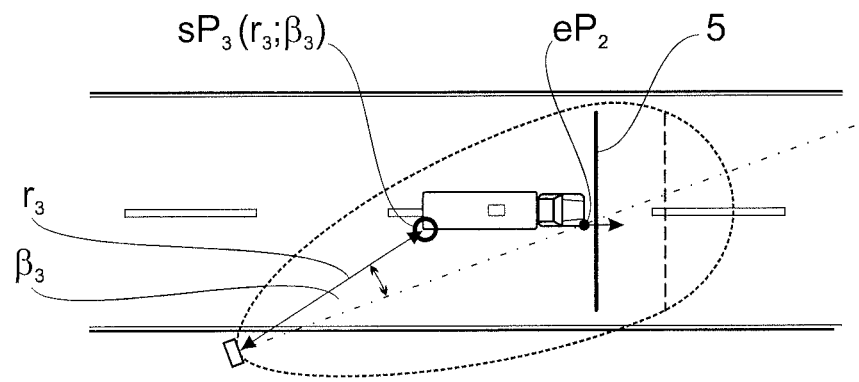
Fig. 1c ($t_3$)

METHOD FOR DETECTING TRAFFIC INFRACTIONS IN A TRAFFIC LIGHT ZONE THROUGH REAR END MEASUREMENT BY A RADAR DEVICE

RELATED APPLICATIONS

The present application claims priority benefit to German Application No. DE 10 2013 102 683.4 filed on Mar. 15, 2013, the contents of which are incorporated by reference in their entirety.

FIELD OF THE INVENTION

The invention is directed to a method for monitoring a trafficway for the purpose of detecting traffic infractions by vehicles in a traffic light zone which is defined by stop lines and through which it is temporarily permissible or temporarily prohibited to drive depending on the switching of a traffic light. A method of this kind is known generically from EP 2 048 515 A1.

BACKGROUND OF THE INVENTION

The known methods for monitoring trafficways are generally distinguished by the use of different types of sensors which are either embedded in the pavement of the roadway (invasive sensors) or are arranged above the roadway (noninvasive sensors). Invasive sensors require a high outlay for installation and must be exchanged from time to time as the roadway pavement wears. Moreover, they are only suitable for stationary arrangements. The trafficway monitored by them is limited by the arrangement of the embedded sensors.

In EP 2 048 515 A1, instead of embedding a sensor at a predetermined location in each individual lane of the multiple-lane roadway, a radar beam is directed substantially horizontal to the roadway and along the edge of the roadway across all of the lanes of the roadway. For this purpose, an angle-resolving radar device (FMCW radar device) for transmitting and receiving radar radiation is positioned relative to the roadway such that it transmits a radar beam forming a radar lobe with a beam width of between 20° and 40° at a horizontal setup angle of the radar beam axis (line of symmetry of the radar lobe) relative to the roadway edge of less than 45°. The radar device can be arranged in such a way that when driving through the radar lobe the vehicles either drive toward the radar device (oncoming traffic, front-measuring radar device) or away from the radar device (receding traffic, rear end-measuring radar device). Here the monitored trafficway is determined with respect to its position and size by the position of the radar beam axis relative to the edge of the roadway and by the beam width of the radar lobe.

According to EP 2 048 515 A1, cited above, the relative position of the vehicle with respect to the radar device which changes over the measurement duration is derived from the radar signals reflected by a vehicle as it drives through the radar lobe. When the relative position of the stop line with respect to the radar device is known, the relative position of the vehicle with respect to the radar device can be used to determine the perpendicular distance of the relative position from the stop line at a plurality of measurement times. Subsequently, the point in time at which the stop line is passed can be deduced from the velocity of the vehicle in question, which velocity has also been derived, and from the perpendicular distance of the relative positions from the stop line, and a photograph is taken if this time point does not occur within the green-light phase of a traffic light associated with the stop line.

The position of the vehicle associated with every measurement time is defined here by the position of a so-called point of impingement for which a distance and an angle are determined from the reflection signals in each instance.

For oncoming traffic where the front end of the vehicle lies in the reflection region of the radar beam, the aforementioned method allows a reliable detection of traffic infractions at a traffic light, since the front end of the vehicle, which is naturally the first to pass the stop line, substantially determines the position of the so-called point of impingement.

For receding traffic where only the rear end of the vehicle is still located in the reflection region of the radar beam with increasing proximity to the stop line and the rear end of the vehicle accordingly substantially determines the position of the so-called point of impingement, there is no detection of traffic infractions where the front end of the vehicle, but not the rear end of the vehicle, passes the stop line at a point in time depending on a given switching state of the traffic light.

SUMMARY OF THE INVENTION

It is an object of the invention to find a method by which a more accurate prediction can be made about the front end of a vehicle driving over a stop line using a rear end-measuring radar device.

In a method for detecting traffic infractions by vehicles in a traffic light zone defined by a stop line by means of rear-end measurement, the above-stated object is achieved by the following method steps:

In a first step, a FMCW radar device is set up next to a roadway with a roadway edge and a traffic light zone defined by a stop line. The FMCW radar device is configured to emit a radar beam forming a radar lobe with a radar axis and is oriented in such a way with respect to the roadway that the radar lobe covers a monitored trafficway that includes the stop line. In so doing, the radar axis forms an acute horizontal setup angle with the roadway edge.

During or subsequent to this step, the perpendicular distance of the stop line from the FMCW radar device is determined in a second step.

In a third step, a radar beam is emitted and measurement signals are received within a measurement duration at a plurality of measurement times (n measurement times, where n is a natural whole number greater than or equal to 3) the intervals between which are constant and are known. The measurement signals are caused by reflection on at least one vehicle measured by the radar beam, and for every measurement time there can be derived from the respective measurement signal as measured quantities for every measured vehicle a radial velocity and a plurality of radial distances of the measured vehicle relative to the FMCW radar device and a plurality of object angles of the measured vehicle relative to the radar axis within a scatter region.

For the sake of simplicity, the method will be described referring to only one measured vehicle.

At least at a first measurement time, a specific radial distance and a specific object angle are determined from the plurality of derived radial distances and derived object angles, which collectively describe a specific position of the measured vehicle reduced to a point in relation to the FMCW radar device, and the radial velocity is derived.

With knowledge of the orientation of the FMCW radar device relative to the roadway and relative to the stop line, particularly the setup angle thereof by means of which the vehicle velocity is determined from the radial velocity and the distance thereof from the stop line, an anticipated time at which the front of the measured vehicle will cross over the stop line is advantageously calculated already from the specific position determined at the first measurement time and from the radial velocity by means of the distance-time rule.

The radial velocity is subsequently derived from the measurement signals at further measurement times of the n measurement times, and the anticipated time is continually recalculated again and thus updated so that it progressively approximates the real time at which the front of the vehicle actually reaches the stop line and which can change as a result of a change in the vehicle velocity. In so doing, the anticipated time is determined at the measurement times by means of calculated anticipated positions of the front of the vehicle at the respective measurement times and not by means of a specific position that is determined at the respective measurement time.

At least one photograph time at which the front of the vehicle is located at the at least one photograph line is calculated iteratively from the updated anticipated times by means of the distance-time rule.

Finally, a camera is triggered to produce at least one evidentiary photograph when the anticipated time is outside of a green-light phase of a traffic light associated with the stop line and the measured vehicle is located at the photograph line whose distance from the stop line is known.

Based on the specific position determined at the first measurement time, a first anticipated position is calculated for the second measurement time and further anticipated positions are calculated at the further measurement times for subsequent measurement times. In this way, the time at which the measured vehicle arrives at the stop line or at a photograph line at a known distance from the stop line can be accurately calculated irrespective of a changing velocity. In so doing, it is assumed that the vehicle moves toward the stop line perpendicularly.

Alternatively, the respective specific position can also be advantageously determined at the further measurement times and a course of travel described by the vehicle can be determined therefrom. In this case it is assumed that the vehicle moves along the determined course of travel toward the stop line. The prediction of the time at which the measured vehicle arrives at the stop line or at a photograph line is then even more accurate because it takes into account not only changes in the vehicle velocity but also the course of travel which can deviate from a straight line and which need not run perpendicular to the stop line.

BRIEF DESCRIPTION OF THE DRAWINGS

The invention will be described more fully in the following with reference to embodiment examples. In the accompanying drawings:

FIG. 1a is a schematic diagram of a measuring setup for carrying out the method with a vehicle in a first position;

FIG. 1b is the diagram of the measuring setup according to FIG. 1a with the vehicle in a second position; and FIG. 1c is the diagram of the measuring setup according to FIG. 1a with the vehicle in a third position.

DESCRIPTION OF THE EMBODIMENTS OF THE INVENTION

A FMCW (Frequency Modulation Continuous Wave) radar device 1 known from the art, advantageously a FSK (Frequency Shift Keying) radar device which is a special type of FMCW radar device 1 by which a plurality of vehicles 3 can also be simultaneously acquired as well as tracked, is advantageously used for the method for detecting traffic infractions in a traffic light zone by a vehicle 3 traveling on a roadway 2. The FMCW radar device 1 emits a radar beam forming a radar lobe 4 on at least two alternating carrier frequencies and receives measurement signals (Doppler signals) caused by reflection from the acquired vehicles 3. A plurality of radial distances and object angles within a scatter region and essentially a radial velocity can be derived from a measurement signal caused by one of the vehicles 3 and formed respectively at individual measurement times in that frequency shifts between and within the at least two carrier frequencies reflected by the vehicles 3 are evaluated by means of a signal processing unit comprised by the FMCW radar device 1. In this way, a good resolution between a plurality of vehicles 3 is made possible within a short measurement duration.

The radar lobe 4 formed by the radar beam is limited by edge beams which form an acute angle with one another and define the beam width of the radar lobe 4. The bisector of the beam width, which also shows the line of symmetry of the radar lobe 4, is understood as a radar axis 41.

To implement the method according to the invention, the FMCW radar device 1 is positioned next to the roadway 2 and is oriented with respect to the latter in such a way that a traffic space (monitored trafficway 6) covered by the radar lobe 4 above the roadway 2 contains a stop line 5. The distance of the FMCW radar device 1 from the stop line 5 must either be set and checked in accordance with a preset when positioned or determined after being positioned. This knowledge can also be gained immediately before carrying out the measurement by learning on the part of the FMCW radar device 1.

The FMCW radar device 1 is preferably arranged next to the roadway 2 so as to be mounted on a mast at a horizontal, perpendicular setup distance from a roadway edge 21 and at a height by a vertical, perpendicular setup distance relative to a roadway surface 22. The FMCW radar device 1 is oriented horizontally in such a way that the radar lobe 4 is formed substantially in driving direction 31 of the vehicles 3 driving on the roadway 2 and covers a trafficway 6 above the roadway 2, which trafficway 6 encloses the stop line 5 on the roadway 2 and covers a region of the roadway 2 in which the vehicles 3 move toward the stop line 5. The radar axis 41 forms a horizontal acute setup angle a with a portion of the roadway edge 21 extending in the radiating direction of the FMCW radar device 1. The vertical orientation of the FMCW radar device 1 is defined by a vertical acute setup angle (not shown) formed by the radar axis 41 and the roadway surface 22.

Further features of the acquired vehicle 3, e.g., the lane in which the vehicle is driving, the course of travel described by the vehicle, the vehicle acceleration and the vehicle velocity, can be derived from the position and orientation of the FMCW radar device 1 and from the determination of measured values (radial velocity, radial distances and object angles) which are produced from and directly derivable from the measurement signals.

The course of travel describes at every measurement time the actual direction of travel of the vehicle 3 on the roadway 2 which need not correspond to the direction of the radial velocity relative to the FMCW radar device 1 and, further, e.g., as a result of the vehicle 3 changing lanes, need not necessarily correspond to the directional path of the roadway 2 or the driving direction 31 generally appointed for this purpose which runs parallel to the roadway edge 21.

The vehicle velocity is the actual speed at which the vehicle 3 travels on the roadway 2.

At least one camera 7 which is advantageously arranged together with the FMCW radar device 1 vertically one above the other on a mast and signal connections 9 connecting a traffic light 8 associated with the stop line 5 to the camera 7 on the one hand and to a signal processing and controlling unit associated with the FMCW radar device 1 on the other hand are required in addition to the FMCW radar device 1.

In order to prepare for the detection of traffic infractions, the FMCW radar device 1 is positioned relative to the roadway 2 such that the vehicles 3 move through the radar lobe 4 toward the stop line 5 as was already mentioned. As the vehicle 3 passes through, the FMCW radar device 1 receives a measurement signal at each of a plurality of measurement times which is caused by reflection on surfaces of the vehicle 3 which are impinged by radar radiation and which reflect the radar radiation back. The measurement signal received respectively at a measurement time is determined in particular by the extension and relative position of the surfaces which reflect the radar radiation back to the FMCW radar device 1. Accordingly, a plurality of radial distances and object angles of reflecting surface regions can be derived from the measurement signals within a scatter region which is largest when the radar beam is reflected back by the entire side of a long vehicle. On the other hand, a radial velocity can be derived quite accurately, since all of the reflecting surface regions naturally have the same velocity. A vehicle 3 offers an increasingly larger reflecting surface, that is, increasingly more reflecting surface regions, as it drives into the radar lobe 4. As the distances of the reflecting impingement points from the FMCW radar device 1 increase, the energy which is reflected back decreases by $$\frac{1}{R^4}$$

and, as a result, reflecting points of impingement located closer to the FMCW radar device 1 supply appreciably stronger reflection signals than the receding surface regions of the same type and orientation with respect to the FMCW radar device 1.

When a vehicle 3 drives into the radar lobe 4 the measurement signal at a first measurement time is formed only by the front corner of the vehicle on the passenger side, which can also be associated with the front of the vehicle, so that a specific position which is acquired at this first measurement time and which will be explained later corresponds to the position of the front of the vehicle. Subsequently, measurement signals are acquired which are determined increasingly by reflections at the vehicle flank. Subsequent measurement signals are additionally increasingly formed by reflections at the rear of the vehicle until, before the stop line 5 is reached, the measurement signals are caused virtually only by reflections at the rear of the vehicle. Therefore, the specific position moves from front to back over the length of the vehicle as it passes through.

It is also possible to arrange the FMCW radar device 1 on a mast at a greater height with respect to the roadway surface 22. This has the advantage that there is less mutual shadowing of vehicles 3 driving through the radar lobe 4 simultaneously.

In order to produce a sufficient separation of detected measurement signals from background noise that is inevitably detected at the same time and in order to improve unambiguity in the signal detection, a threshold value is determined for the signal intensity, which threshold value must be exceeded by the measurement signal in order to be used for further signal processing.

In principle, the threshold value can also be defined by the sensitivity limit of the radar sensor of the FMCW radar device 1, which sensitivity limit is technically determined and cannot be actively assigned.

The detection of measurement signals during the passage of the vehicle 3 through the radar lobe 4 determining the measurement duration takes place continuously at a plurality of measurement times separated by a constant, known time period.

One of the vehicles 3 is shown in FIGS. 1a to 1c by way of example at three different such measurement times, namely at measurement times $t_1$, $t_2$ and $t_3$. The time period between the successive measurement times $t_1$, $t_2$ and $t_3$ can be adapted in accordance with the required resolution of the measurements and the technical characteristics of the FMCW radar device 1, particularly of its radar sensor and signal processing unit.

Measurement values are obtained from the measurement signal acquired at a respective measurement time, namely a radial velocity and additionally, as specific position values at least at a first measurement time $t_1$, a specific radial distance $r_1$ and a specific object angle $\beta_1$. For this purpose, the specific radial distance and the specific object angle are calculated in each instance from the plurality of radial distances and object angles derived from a measurement signal by a predefined computation rule, e.g., averaging. Provided that the radial distances and object angles derived at a measurement time do not lie within a scatter region that can be associated with only one vehicle 3, it can be concluded that they were caused by a plurality of vehicles 3. A specific radial distance and a specific object angle are correspondingly calculated in each instance for the plurality of vehicles 3 and are assigned by pairs relating to the measurement time as specific position to a radial velocity and to one of the vehicles 3. If this assignment can be confirmed over a plurality of measurement times, there is an increased probability that the assignment will already have a high reliability after only a few measurement times. After at least some of the measurement signals have been assigned to one of the vehicles 3 the precondition has been met for tracking the vehicle 3 in question as it proceeds further through the radar lobe 4 and for assigning further measurement signals to this vehicle 3 also.

By forming the specific position, the vehicle 3 is embodied at every measurement time by a point whose temporary position with respect to the FMCW radar device 1 and with respect to the radar axis 41 is described in each instance by the assigned specific radial distance and the assigned specific object angle. The position of the vehicle 3 can be reduced in each instance to the position of this point (specific position) during signal processing.

Regardless of the computation rule by which the specific position is formed, it ultimately describes the location of the vehicle 3 reduced to a point, and this point moves from the front of the vehicle to the rear end of the vehicle as it travels through the radar lobe 4, i.e., it undergoes a deviation by the length of the vehicle.

As regards a tracking of the vehicle 3 so that a measured velocity can also be assigned with certainty to one of the vehicles 3 in a group of vehicles 3 or in order to determine the course of travel described by a vehicle 3, this deviation is negligible because it increases continuously throughout the entire through-passage.

This deviation is unimportant with regard to the derivation of the radial velocity by means of which the vehicle velocity is calculated with the aid of the known setup data of the FMCW radar device 1 because it can be presupposed that all surfaces of a solid body, and therefore also those of the vehicles 3, move at the same velocity.

In a traffic situation where only one vehicle 3 can be located in the monitored trafficway 6, it is sufficient that, in addition to the radial velocity, the specific position values, namely, the specific radial distance $r_1$ and the specific object angle $\beta_1$, are also derived from the measurement signal only at the first measurement time $t_1$ for determining the specific position $sP_1$ of one of the vehicles 3. When the setup parameters of the FMCW radar device 1 are known, a perpendicular distance a of the specific position $sP_1$ from the stop line 5 is calculated from the specific radial distance $r_1$ and the specific object angle $\beta_1$ and the vehicle velocity is calculated from the radial velocity.

A provisional anticipated time at which the front of the measured vehicle 3 crosses the stop line 5 is then calculated from the perpendicular distance a and the vehicle velocity using the distance-time rule. Starting from the known specific position $sP_1$ which is determined for the front of the vehicle at a first measurement time $t_1$, the distance-time rule (velocity=distance×time) makes it possible with knowledge of the vehicle velocity to predict when the front of the vehicle has covered a certain distance and the distance it has covered after a determined time.

At the subsequent measurement times, only the radial velocity need be derived from the measurement signals and, with knowledge of the time period between the consecutive measurement times, an anticipated time which is updated in this way needs to be calculated. The updated anticipated time confirms the projected anticipated time when the vehicle velocity is constant.

A first embodiment example will be described referring to FIGS. 1*a*-1*c*.

FIG. 1*a* shows a vehicle 3 at the moment of entering the radar lobe 4. At a first measurement time $t_1$, the FMCW radar device 1 receives a measurement signal from which a vehicle velocity, a first specific radial distance $r_1$ and a first specific object angle $\beta_1$ are obtained as mentioned above. The measurement signal is caused exclusively by reflections of the radar beam on the front right-hand corner of the vehicle which embodies the temporary position of the front of the vehicle. With knowledge of the perpendicular distance a of the stop line 5 from the FMCW radar device 1, the vehicle velocity and the first specific position $sP_1$ (determined by the first specific radial distance $r_1$ and the first specific object angle $\beta1$), a provisional anticipated time at which the front of the vehicle will reach the stop line 5 and/or a photograph line 10 relating to this stop line 5 is calculated by means of the distance-time rule. At the same time, with knowledge of the first specific position $sP_1$, the vehicle velocity at the first measurement time $t_1$ and the time period between two consecutive measurement times, a first anticipated position $eP_1$ at which the front of the vehicle 3 is located at the subsequent second measurement time $t_1$ is calculated using the distance-time rule. In so doing, it is assumed that the vehicle 3 moves perpendicularly toward the stop line 5. The quantity of measurement times is limited to the hypothetical number of three for describing the method; however, in practice, depending on the frequency of measurement cycles, the vehicle velocity and the distance of the lane from the FMCW radar device 1, this quantity is as much as several hundred measurement times per passage.

FIG. 1*b* shows the vehicle 3 at the second measurement time $t_2$. Only the radial velocity is derived from the measurement signal obtained at the second measurement time $t_2$, and an updated anticipated time is calculated using the distance-time rule from the calculated first anticipated position $eP_1$, the actual vehicle velocity calculated from the derived radial velocity, and the time period between the first measurement time $t_1$ and second measurement time $t_2$. Provided that the velocity of the vehicle 3 has not changed in the meantime, the front of the vehicle is actually located at the previously calculated first anticipated position $eP_1$ as is shown here. When there is a change in the vehicle velocity, which is checked by means of the derivation of the radial velocity from the measurement signal at the second measurement time $t_2$, the front of the vehicle is actually located in front of or behind the calculated first anticipated position $eP_1$. By determining a second anticipated position $eP_2$ starting from the first anticipated position $eP_1$ for the third measurement time $t_3$ based on the radial velocity derived at the second measurement time $t_2$, the second anticipated position $eP_2$ again approximates the real position of the right-hand corner of the front of the vehicle 3 at the third measurement time $t_3$. Accordingly, the front of the vehicle is tracked in that the anticipated position for the next measurement time is determined in each instance at the measurement times solely by means of the repeatedly acquired radial velocity and the known, constant time period between two consecutive measurement times.

Finally, an n–1st anticipated position for the front of the vehicle 3 is calculated by the distance-time rule at an nth measurement time in each instance from an n–2nd anticipated position, the time period between the measurement times and the radial velocity derived at the n–1st measurement time.

By means of the anticipated positions, an anticipated time at which the front of the measured vehicle 3 will cross the stop line 5 is calculated by the distance-time rule at every nth measurement time from the n–1st anticipated position determined at the nth measurement time and the radial velocity derived at the n–1st measurement time so that the calculated anticipated time iteratively approaches the real time at which the front of the measured vehicle 3 actually crosses the stop line 5.

In this way, the anticipated time iteratively approaches the actual time at which the front of the vehicle 3 reaches the stop line 5 or a photograph line 10 located at a known distance from the stop line 5. This means that the prediction is comparatively more accurate. When the front of the vehicle 3 reaches a photograph line 10, the camera 7 can be triggered. The photograph line 10 can be located in front of the stop line 5 so as to determine the traffic situation prior to the infraction and/or in order to document the infraction on or behind the stop line 5. Of course, cameras 7 with different resolution or different focal length can also be used for capturing the photographs at different photograph lines 10.

The shorter the duration between measurement times $t_1$, $t_2$, $t_3$, the closer an anticipated position $eP_1$, $eP_2$ for the front of the vehicle 3 at the next measurement time to the real position of the front of the vehicle 3 at the next measurement time and, correspondingly, the more accurate the prediction for the time at which the stop line 5 is reached, i.e., for the anticipated time. The prerequisite for an accurate prediction is that the vehicle 3 moves perpendicularly toward the stop line 5, i.e., the course of travel described by the vehicle describes a straight line extending perpendicular to the stop line 5.

In a second embodiment example for the method, the specific position values $sP_2$ and $sP_3$ are also derived (see FIG. 1*b* and FIG. 1*c*) from the measurement signals at the subsequent measurement times, in this case $t_2$ and $t_3$, and the respective temporary movement direction of the vehicle 3 described by the course of travel is determined by tracking the vehicle 3 as is known from the prior art. The front of the vehicle 3 is tracked corresponding to the first embodiment example in that the anticipated position $eP_1$, $eP_2$ is determined at measurement times $t_1$, $t_2$ for the next measurement time $t_2$, $t_3$, respectively. With knowledge of the course of travel, a section described between the two measurement times by the determined course of travel, rather than a straight section perpendicular to the stop line 5 as in the first embodiment example, is adopted as distance between two measurement times. In this way, the anticipated positions can also be accurately determined when the course of travel is not a straight line or is a straight line which does not run perpendicular to the stop line 5. In such cases, the distance covered by the vehicle 3 to the stop line 5 is longer so that it can be ensured in this way, particularly for borderline cases, that the camera 7 is actually triggered only when the infraction definitely takes place. This arrangement of the method can be used to counter any possible argument that the front of the vehicle 3 could have arrived at the stop line 5 later than predicted because, e.g., there was a change of lanes.

For an even more accurate prediction, the calculation of the anticipated time for reaching the stop line 5 or the anticipated positions at a respective subsequent measurement time can take into account the measurement time and computing time elapsing at every measurement time between the reception of the measurement signal and the output of the computation results. In other words, it is not the time at which the computing results are available, but a time at which the computation results are available, minus the measuring and computing time, that is regarded as the measurement time.

If a plurality of vehicles 3 can be located in the monitored trafficway 6 simultaneously based on the traffic situation, it is imperative that the specific position values also be derived from the measurement signals at the subsequent measurement times in order to track the measured vehicles 3 and assign the derived radial velocities with certainty to the correct vehicle 3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 FMCW radar device
2 roadway
  21 roadway edge
  22 roadway surface
3 vehicle
  31 driving direction
4 radar lobe
  41 radar axis
5 stop line
6 monitored trafficway
7 camera
8 traffic light
9 signal connection
10 photograph line
a perpendicular distance
α horizontal setup angle
$β_1$ specific object angle at the first measurement time
$r_1$ specific radial distance at the first measurement time
$sP_1$ specific position at the first measurement time
$β_2$ specific object angle at the second measurement time
$r_2$ specific radial distance at the second measurement time
$sP_2$ specific position at the second measurement time
$β^3$ specific object angle at the third measurement time
$r_3$ specific radial distance at the third measurement time
$sP_3$ specific position at the third measurement time
$eP_1$ first anticipated position (for the front of the vehicle at the second measurement time)
$eP_2$ anticipated position for the front of the vehicle at the third measurement time
$t_1$ first measurement time
$t_2$ second measurement time
$t_3$ third measurement time

What is claimed is:

1. Method for detecting traffic infractions by vehicles in a traffic light zone defined by a stop line by rear-end measurement comprising the following steps:

setting up a FMCW radar device next to a roadway with a roadway edge and a stop line defining a traffic light zone, which FMCW radar device emits a radar beam forming a radar lobe with a radar axis, aligning the FMCW radar device such that a monitored trafficway covered by the radar lobe completely covers the stop line and the radar axis forms an acute horizontal setup angle with the roadway edge, determining a perpendicular distance of the stop line from the FMCW radar device, emitting a radar beam and receiving a measurement signal in each instance at n measurement times ($t_n$), n≥3, between which there is a known constant time period, which measurement signal is caused by reflection at a vehicle measured by the radar beam, deriving a radial velocity and a plurality of radial distances and object angles from the measurement signal at a first measurement time, wherein the measurement signal at the first measurement time is caused only by reflection at a front right-hand corner of a front of the vehicle, calculating a specific radial distance and a specific object angle from the plurality of radial distances and object angles for determining a specific position of the front of the vehicle at the first measurement time, calculating by means of the distance-time rule a first anticipated position for the front of the vehicle at the second measurement time from the specific position determined at the first measurement time, the time period between the measurement times and the radial velocity derived at the first measurement time, calculating an n−1st anticipated position for the front of the vehicle in each instance by the distance-time rule at an nth measurement time in each instance from an n−2nd anticipated position, the time period between the measurement times and the radial velocity derived at the n−1st measurement time, where n≥3, calculating by the distance-time rule an anticipated time at which the front of the measured vehicle will cross the stop line from the n−1st anticipated position determined at the nth measurement time and the radial velocity derived at the nth measurement time so that the calculated anticipated time iteratively approaches the real time at which the front of the measured vehicle actually crosses the stop line, and triggering a camera to produce at least one evidentiary photograph when the calculated anticipated time is outside of a green-light phase of a traffic light associated with the stop line and the vehicle is located at at least one photograph line having a known distance from the stop line.

2. Method according to claim 1, wherein it is assumed for determining the anticipated positions that the vehicle moves perpendicularly toward the stop line.

3. Method according to claim 1, wherein the respective specific positions are also determined at the further measurement times and a course of travel described by the vehicle is determined therefrom, and it is assumed that the vehicle moves along the determined course of travel toward the stop line.

4. Method according to claim 1, wherein the method is carried out in an analogous manner simultaneously for determining anticipated times for more than one vehicle when more than one vehicle passes through the monitored trafficway at the same time.

* * * * *